United States Patent [19]
Smith

[11] 3,991,569
[45] Nov. 16, 1976

[54] FUEL CONTROL SYSTEM FOR GAS TURBINE ENGINE

[75] Inventor: Trevor Stanley Smith, Sutton Coldfield, England

[73] Assignee: Lucas Industries Limited, Birmingham, England

[22] Filed: July 3, 1975

[21] Appl. No.: 592,734

[30] Foreign Application Priority Data
Aug. 1, 1974 United Kingdom............... 33939/74

[52] U.S. Cl............................................ 60/39.28 R
[51] Int. Cl.²......................... F02C 9/08; F02C 9/10
[58] Field of Search....................... 60/39.28 R, 243

[56] References Cited
UNITED STATES PATENTS
3,672,163  6/1972  White............................ 60/39.28 R
3,808,797  5/1974  Robinson....................... 60/39.28 R

*Primary Examiner*—Clarence R. Gordon

[57]  ABSTRACT

A fuel control system for a gas turbine engine has a pump, a variable metering device and a servo-operated throttle valve connected in series. A spill valve at the pump outlet is responsive to a servo pressure which is dependent on engine speed and on the total pressure drop across the metering device and the throttle valve. A selector valve is effective in one of its positions to shut the throttle valve and simultaneously to modify the servo pressure to the spill valve so as to increase spill flow to a maximum.

8 Claims, 5 Drawing Figures

FUEL CONTROL SYSTEM FOR GAS TURBINE ENGINE

This invention relates to fuel control systems for gas turbine engines.

According to the invention a fuel control system for a gas turbine engine comprises a pump, a spill valve responsive to a first servo pressure signal to spill fuel from the outlet of said pump, a variable metering device downstream of said pump, a control valve downstream of said metering device, said control valve including an element movable in response to a second servo pressure signal to vary fuel flow to the engine, and electrically-operated pilot valve responsive to an increase in engine speed to vary said second servo pressure signal in a sense to decrease fuel flow to the engine, a further pilot valve, responsive to the total pressure drop across said metering device and said control valve, for controlling said first servo pressure signal, an increase in said pressure drop varying said first servo pressure signal in a sense to cause said spill valve to increase spill flow, and a selector valve in parallel with said electrically operated pilot, said selector valve being operable in one position to vary said second servo pressure signal so as to shut said control valve, to connect the outlet of said control valve to a low pressure, and to vary said first servo pressure signal in a sense to increase spill flow.

An example of the invention will now be described with reference to the accompanying drawings, in which.

Figure 1:
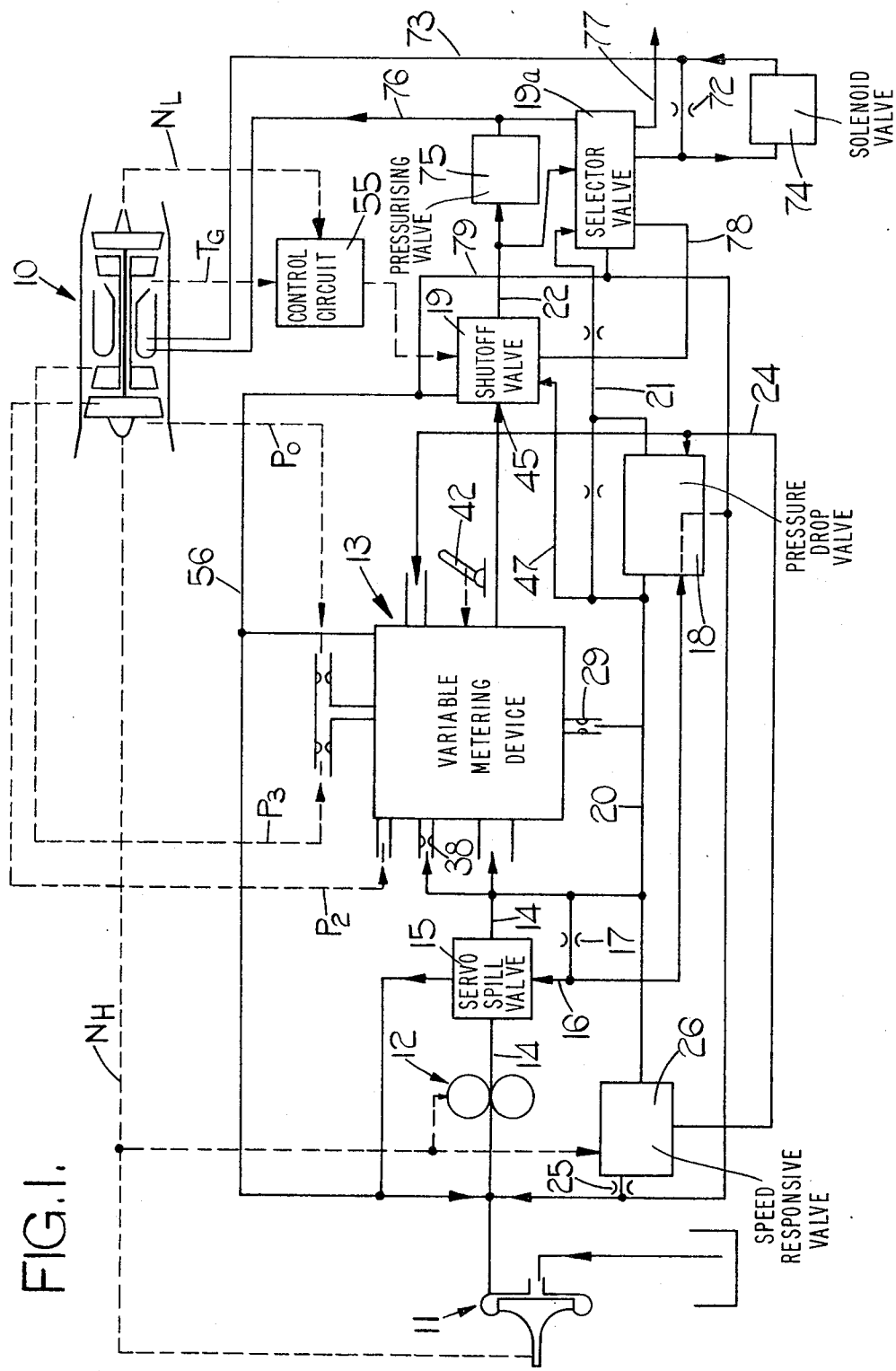
FIG. 1 is a block diagram of a fuel control system.

A twin-spool gas turbine engine 10 is supplied with fuel by means of a centrifugal pump 11 and a positive displacement pump 12, both of which are driven at a speed $N_H$ by the engine high speed shaft. Fuel is delivered from pump 12 to a variable metering device via a line 14. A servo spill valve 15 is responsive to an increase in the pressure in line 14, or to a decrease of the pressure in a line 16, to increase spill flow of fuel from the downstream side to the upstream side of the pump 12.

The pressure in line 16 is derived from a fluid potentiometer formed by a restrictor 17 and a valve 18. Valve 18 is responsive to the total pressure drop across the metering device 13 and a shut-off valve 19. Shut-off valve 19 is shown in detail in FIG. 3 and is connected in series with the metering device 13 downstream thereof. Associated with the shut-off valve 19 is a manually-controlled selector valve 19a.

Figures 4, 5:
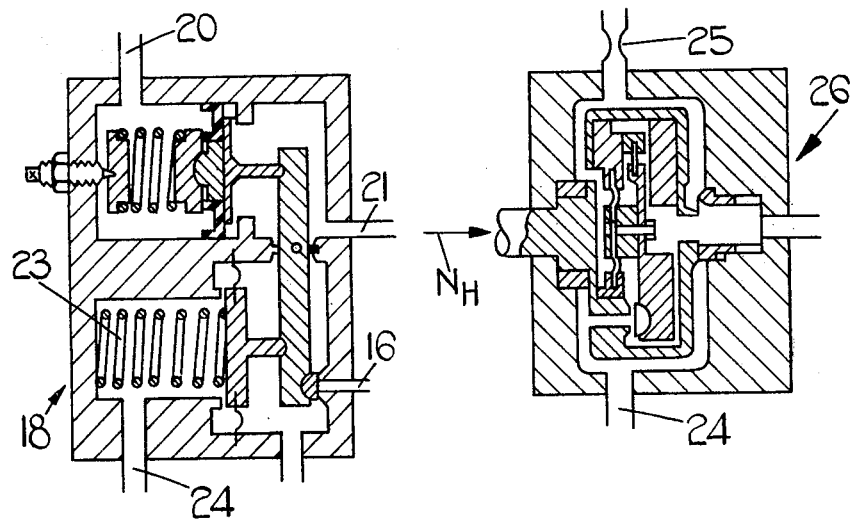
FIG. 4 shows a pressure-drop valve forming part of FIG. 1.
FIG. 5 shows a speed-responsive valve forming part of FIG. 1.

The pressure drop responsive valve 18 is shown in detail in FIG. 4 and is connected by lines 20, 21 respectively to the line 14 and to the selector valve 19a. Valve 18 is responsive to the difference between the pressures in lines 20, 21 to vary the restriction between line 16 and the upstream side of pump 12. Valve 18 is biased shut by a spring 23 and also by a pressure signal in a line 24. A decrease in the pressure difference between lines 20, 21 increases the pressure in line 16, reducing spill flow from the outlet of pump 12.

The pressure in line 24 is derived from the pressure in line 14 by means of a speed-responsive valve device 26 (FIG. 5), which is connected in series with a restrictor 25 between line 20 and the inlet of pump 12. Valve 26 includes a governor mechanism driven by the engine 10 at speed $N_H$, such that the pressure in line 24 increases with an increase in speed $N_H$.

Figure 2:
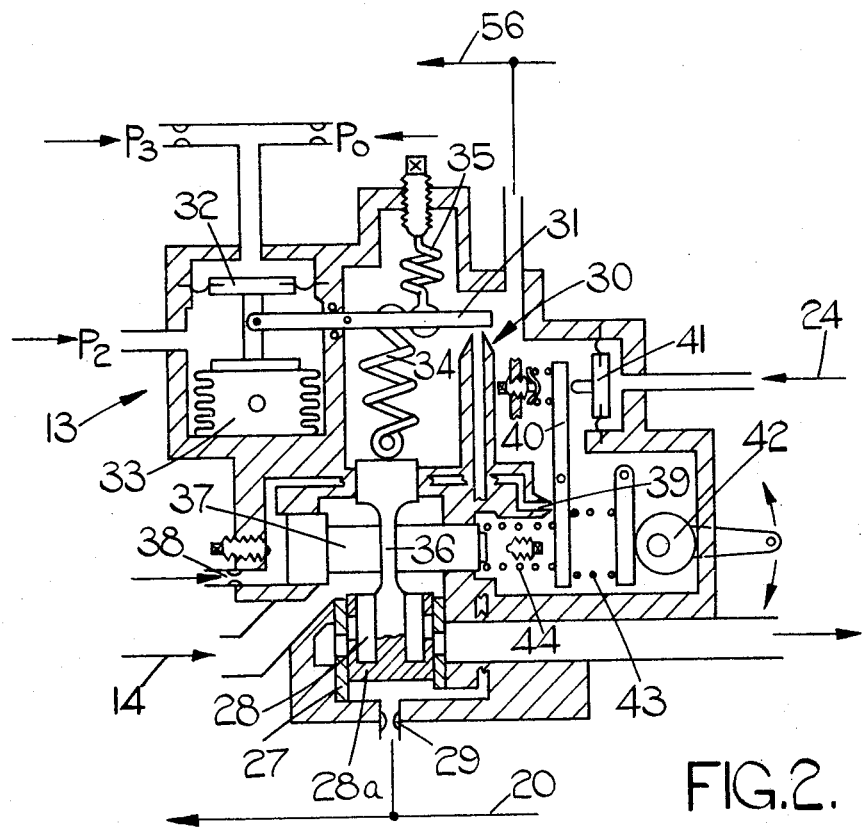
FIG. 2 shows, diagrammatically, details of variable metering device forming a part of FIG. 1.

The metering device 13 is shown in detail in FIG. 2 and has a fixed ported sleeve 27 within which a control member 28 is both rotatable and axially slidable. The ports in both the sleeve 27 and member 28 are rectangular and co-operate to define a variable metering orifice through which fuel flows to the engine 10. Control member 28 includes a piston portion 28a which is responsive to a servo pressure which exists intermediate a restrictor 29 and a pilot valve 30 connected between the line 14 and the upstream side of pump 12. The control element 31 of valve 30 is positioned by a diaphragm 32. Diaphragm 32 is responsive to engine compressor inlet pressure $P_0$ and to engine compressor outlet pressure $P_3$. An intermediate pressure $P_2$ of the engine compressor acts on diaphragm 32 and also on an evacuated bellows 33. A position feedback from control member 28 is provided by a spring 34 which connects control member 28 to control element 31. Control element 31 is biased towards an open position by an adjustable spring 35.

Control member 28 has a stem 36 which has a radial projection (not shown) which engages a complementary recess in a piston 37, so that axial movement of piston 37 causes member 28 to be rotated within sleeve 27. Piston 37 is axially movable by a servo pressure derived, by means of a restrictor 38 and a pilot valve 39, from the pressure in line 14.

The control element 40 of valve 39 is urged towards an open position by an increase in pressure in line 24, acting on a diaphragm 41. The control element 40 is urged in the opposite direction by a cam 42 acting through a spring 43. Cam 42 is positioned manually in accordance with a desired engine speed. A spring 44 between element 40 and piston 37 provides a feedback of the position of piston 37. Control member 28 is thus positioned angularly in accordance with the difference between desired and actual engine speeds, and axially in accordance with the pressure difference across the engine compressor. The flow area of the metering orifice defined by the ports in control member 28 and sleeve 27 is thus dependent effectively on the product of the parameters providing axial and rotary movement of member 28.

Figure 3:
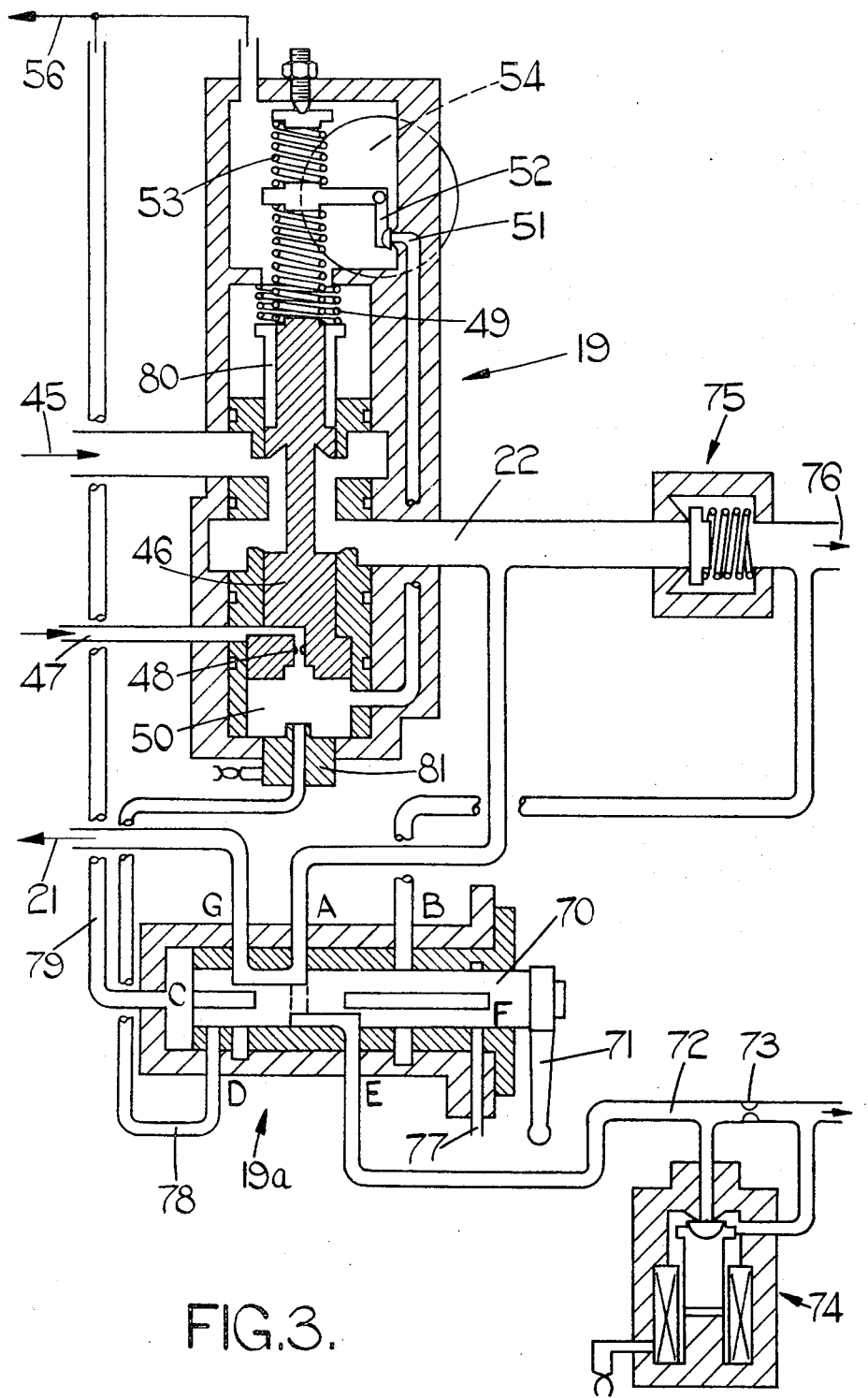
FIG. 3 shows, diagrammatically, details of a selector valve forming a part of FIG. 1.

The shut-off valve 19 has, as shown in FIG. 3, an inlet connection 45 communicating with the outlet of metering device 13. A spool control element 46 controls flow between the inlet 45 and an outlet connection 22 of valve 19. Element 46 is movable to increase flow through outlet 22 in response to an increase in a servo pressure in a chamber 50, this pressure being derived from the outlet of pump 12 via lines 20, 47 and a restrictor 48. Element 46 is biased against an increase in the servo pressure signal by a spring 49.

The pressure signal in chamber 50 is controlled by a pilot valve arrangement having an orifice 51 and a closure member 52. Closure member 52 is movable against a spring 53 by a torque motor 54, to open the pilot valve and reduce the pressure in chamber 50. Torque motor 54 is responsive to an electrical control signal from a circuit 55 which is responsive to the speed $N_L$ of the low speed shaft of the engine 10, and to the temperature $T_G$ of the exhaust gases from the high speed turbine. Fuel leaving orifice 51 of the pilot valve is vented to the low pressure upstream of pump 12 via a line 56.

In the event that either speed $N_L$ or temperature $T_G$ rises above acceptable limits, closure member 52 moves to reduce the servo pressure in chamber 50 and thereby to reduce fuel flow through valve 19.

The manually-operated selector valve 19a has a control element 70 which is movable by a lever 71 into either one of two positions. In the first position (shown) the selector valve 19a connects the outlet 22 of shut-off valve 19 via line 21 to the pressure-drop responsive valve 18. The resultant pressure in line 21 operates valve 18 in a manner tending to restrict the flow therethrough from restrictor 17, and thereby to raise the pressure in line 16. Increased pressure in line 16 reduces spill flow from the valve 15.

In the shown position of selector valve 19a the outlet 22 of shut-off valve 19 is also connected via a restrictor 72 to a supply line 73 for the engine pilot burners. A solenoid valve 74 bypasses restrictor 72 so that when valve 74 is energised there is maximum fuel flow to the pilot burners.

In the shown position of selector valve 19a the outlet 22 of shut-off valve 19 is connected to line 21, so that the pressure-drop valve 18 is responsive to the pressure at outlet 22. Outlet 22 is also connected via a line 72 and a restrictor 73 to the engine pilot burners. A solenoid valve 74 bypasses the restrictor 73 so that when valve 74 is energised there is a maximum flow to the pilot burners.

A spring loaded pressurising valve 75 is provided downstream of valve outlet 22 and communicates with a supply line 76 for the engine main burners. In the second operating position of valve 19a, outlet 22 and supply lines 72, 76 communicate with a drain passage 77. In this position of valve 19a, moreover, chamber 50 communicates via passages 78, 79 with the low pressure return line 56. Control element 46 therefore moves to shut off fuel flow from outlet 22.

In the second operating position of valve 19a, moreover, line 21 is connected to the low-pressure passage 79, opening valve 18, so that the resultant low pressure in line 16 causes valve 15 to provide a maximum spill flow.

Control element 46 is provided with grooves 80 which, in the shut position of valve shut-off 19 interconnect inlet 45 and the low pressure return line 56. Valve 19 is provided with a probe 81 which provides an electrical output signal when closure element 46 is at, or near, its fully shut position.

I claim:

1. A fuel control system for a gas turbine engine, comprising a pump, a spill valve responsive to a first servo pressure signal to spill fuel from the outlet of said pump, a variable metering device downstream of said pump, a control valve downstream of said metering device, said control valve including an element movable in response to a second servo pressure signal to vary fuel flow to the engine, and an electrically-operated pilot valve responsive to an increase in engine speed to vary said second servo pressure signal in a sense to decrease fuel flow to the engine, a further pilot valve, responsive to the total pressure drop across said metering device and said control valve, for controlling said first servo pressure signal, an increase in said pressure drop varying said first servo pressure signal in a sense to cause said spill valve to increase spill flow, and a selector valve in parallel with said electrically-operated pilot valve, said selector valve being operable in one position to vary said second servo pressure signal so as to shut said control valve and to vary said first servo pressure signal in a sense to increase spill flow.

2. A system as claimed in claim 1 which includes a pressurizing valve downstream of said control valve, and in which said selector valve is operable, in said one position thereof, to connect the downstream side of said pressurizing valve to a low pressure.

3. A system as claimed in claim 1 which includes a passage through which fuel can flow from the outlet of said control valve to pilot burners of the engine, said selector valve being operable, in said one position thereof, to connect said passage to a low pressure.

4. A system as claimed in claim 1 in which said control valve control element includes a passage for interconnecting, in the shut position of said control valve, the control valve inlet and a low pressure connection.

5. A system as claimed in claim 1 which includes a valve, responsive to the speed of the engine, for deriving a third servo pressure signal from the pressure at the outlet of said pump, said metering device being responsive to said third servo pressure signal.

6. A system as claimed in claim 5 in which said further pilot valve is also responsive to said third servo pressure signal, an increase in said engine speed varying said first servo pressure signal in a sense to reduce spill flow through said spill valve.

7. A system as claimed in claim 1 in which said further pilot valve includes first and second connections to which the respective pressures at the inlet of said variable metering device and the outlet of said control valve can be applied, and increase in the pressure at said second connection varying said first servo pressure signal in a sense to reduce spill flow, and said selector valve is operable in said one position to isolate said second connection from said control valve outlet and to connect said second connection to a low pressure.

8. A system as claimed in claim 1 in which said selector valve is also operable in said one position thereof to connect the outlet of said control valve to a low pressure.

* * * * *